Nov. 1, 1960 J. D. TURLAY 2,958,278

DEPTH CHARGE FIRING MECHANISM

Filed Jan. 25, 1944 10 Sheets-Sheet 1

Inventor

J. D. TURLAY

By [signature]

Attorney

Nov. 1, 1960 J. D. TURLAY 2,958,278

DEPTH CHARGE FIRING MECHANISM

Filed Jan. 25, 1944 10 Sheets-Sheet 2

Inventor

J. D. TURLAY

By [signature]

Attorney

Nov. 1, 1960 J. D. TURLAY 2,958,278

DEPTH CHARGE FIRING MECHANISM

Filed Jan. 25, 1944 10 Sheets-Sheet 3

Inventor

J. D. TURLAY

By [signature]

Attorney

Nov. 1, 1960 J. D. TURLAY 2,958,278

DEPTH CHARGE FIRING MECHANISM

Filed Jan. 25, 1944

10 Sheets-Sheet 4

Inventor

J. D. TURLAY

[signature]

Attorney

Nov. 1, 1960 J. D. TURLAY 2,958,278

DEPTH CHARGE FIRING MECHANISM

Filed Jan. 25, 1944 10 Sheets-Sheet 5

Inventor

J. D. TURLAY

By [signature]

Attorney

Nov. 1, 1960 J. D. TURLAY 2,958,278

DEPTH CHARGE FIRING MECHANISM

Filed Jan. 25, 1944 10 Sheets-Sheet 6

Inventor
J. D. TURLAY

By [signature]
Attorney

Nov. 1, 1960 J. D. TURLAY 2,958,278

DEPTH CHARGE FIRING MECHANISM

Filed Jan. 25, 1944 10 Sheets-Sheet 7

Inventor

J. D. TURLAY

By [signature]

Attorney

Nov. 1, 1960 J. D. TURLAY 2,958,278

DEPTH CHARGE FIRING MECHANISM

Filed Jan. 25, 1944 10 Sheets-Sheet 8

Inventor

J. D. TURLAY

By [signature]

Attorney

Nov. 1, 1960 J. D. TURLAY 2,958,278

DEPTH CHARGE FIRING MECHANISM

Filed Jan. 25, 1944 10 Sheets-Sheet 9

Inventor
J. D. TURLAY

By [signature]
Attorney

DEPTH CHARGE FIRING MECHANISM

Filed Jan. 25, 1944 10 Sheets-Sheet 10

Inventor
J. D. TURLAY
By [signature]
Attorney

United States Patent Office 2,958,278

Patented Nov. 1, 1960

2,958,278

DEPTH CHARGE FIRING MECHANISM

Joseph D. Turlay, 4536 N. Chelsea Lane, Bethesda, Md.

Filed Jan. 25, 1944, Ser. No. 519,596

20 Claims. (Cl. 102—7)

(Granted under Title 35, U.S. Code (1952), sec. 266)

This invention relates to firing mechanisms for depth charges of the type adapted to be fired selectively either electrically only or electrically or mechanically at a predetermined depth of submergence within the water. Such a firing arrangement for a depth charge, for example, is disclosed in the copending application of Harry H. Moore et al. for Depth Charge Firing Mechanism, Serial No. 474,354, now Patent No. 2,713,496, filed February 1, 1943. More specifically, the present invention relates to a new and improved firing mechanism suitable for use with a depth charge of the aforesaid type in which a minimum number of parts consistent with a reliable operation of the mechanism is employed and the several parts are arranged in such a manner as to provide a high degree of control of the firing of the depth charge at a predetermined depth of submergence thereof within the water, to prevent accidental and premature operation of the mechanism by shocks received thereby, to facilitate the ready installation and removal of the detonating means and booster charge therefor, and to permit a firing and recocking operation of the mechanism.

In the arrangement of the present invention the detonating means, which is adapted to be fired either mechanically or electrically, is contained in a common housing or holder therefor thereby to form a single unit, hereinafter generally referred to as the detonator unit. The booster charge is formed in such a manner as to receive the detonator unit into operative relation therewith when the mechanism is armed and also to permit a removal of the detonator unit from the mechanism by withdrawing the unit through the booster charge, the detonator unit and booster charge each being readily installed on or removed from the mechanism. Thus, by reason of the foregoing arrangement, the mechanism may be assembled without the detonator unit and booster charge therefor, if desired, and the parts may be shipped separately to a depth charge assembly depot for assembly thereat, thereby to promote a safe handling of the mechanism. Moreover, with the detonator unit and the booster charge removed, the mechanism safely and conveniently may be fired and recocked and otherwise tested and inspected for conformance to manufacturing requirements.

According to the arrangement of the present invention, as the depth charge sinks within the water, the firing mechanism operates positively and directly under pressure of the surrounding water to move the detonator unit gradually into an extended or armed position with respect to the booster charge and thereafter operates to develop gradually and release suddenly a force sufficient to fire the detonator unit mechanically at a predetermined depth of submergence corresponding to a preselected one of a plurality of different depth settings provided on the mechanism. This operation is accomplished structurally by the provision of a hydrostatically controlled piston adapted to be moved gradually against the opposing force of an arming spring and a depth setting spring from an initial or cocked position to a firing position by reason of the water pressure thereon. The piston slideably supports a sleeve to which the detonator unit is detachably secured, and the sleeve, in turn, slideably supports a firing pin. The provision of releasably interlockable connections between these parts coordinates the operation therebetween in such a manner that when a force is gradually applied to the piston, the piston, sleeve and firing pin are adapted to move as a unit until further movement of the sleeve and firing pin is arrested, at which time the detonator unit is set in the armed position thereof. The piston thereafter is adapted to move with respect to the sleeve and firing pin to compress a firing spring interposed therebetween until the piston moves into the firing position thereof, in which position the piston releases a locking connection between the firing pin and the sleeve, and the firing pin thereupon moves suddenly under power of the firing spring to strike the detonator unit.

However, when shocks are received by the mechanism such, for example, as occur in the accidental dropping thereof, or of the assembled depth charge, or when the depth charge strikes the surface of the water during the launching operation, the inertia forces suddenly developed by the aforesaid piston, sleeve, and firing pin are arrested by the releasably interlockable connections therebetween thereby to prevent sufficient movement of the parts to arm or fire the mechanism.

Moreover, the releasably interlockable connections between the piston, sleeve, and firing pin are arranged in such a manner as to permit a recocking operation of the mechanism after a firing operation thereof. The recocking operation is accomplished by applying a sufficient force in any suitable manner to the firing pin to move the same into a position for releasing a locking connection between the sleeve and piston thereby to permit the automatic restoration of the piston, sleeve, and firing pin to the cocked positions thereof under power of the aforesaid arming spring.

The pressure required to move the piston between the cocked and firing positions thereof is controlled by the extent to which the aforesaid depth setting spring is compressed during the movement of the piston between such positions. The provision of a lost motion connection between the piston and the depth setting spring and the means for providing a plurality of different adjustments of the lost motion in the connection corresponding respectively to the aforesaid plurality of different depth settings provides a means for varying the compression of the depth setting spring and, consequently, the depth of submergence of the depth charge at which the firing thereof occurs, substantially in the same manner as disclosed in the aforesaid application of Harry H. Moore et al.

In the present invention, however, additional means are provided for adjusting the lost motion in the connection for the purpose of calibrating the operation of the mechanism with respect to the depth settings thereof. The calibration is accomplished by varying the lost motion in the connection for a particular setting of the mechanism until the mechanism fires at a pressure or depth which conforms substantially to the depth indicated by the particular setting. The calibration of the mechanism compensates for variations in the spring rates of the several springs of the mechanism and for variations in dimensional and other physical requirements thereof thereby to render the mechanism susceptible of an operation providing a high degree of control of the firing of the depth charge at a predetermined depth of submergence within the water.

The mechanism of the present invention includes a yieldably mounted valve for controlling a port therein through which water is admitted into the mechanism when the valve moves under pressure of the surrounding water. However, when a sudden impulse of pressure is received through the water such, for example, as when another depth charge explodes within the vicinity of the descending depth charge, the valve moves to close the port thereby to prevent a surge of water within the mechanism sufficient to arm or fire the same.

By reason of the aforesaid mounting of the valve, the valve is subject to being sealed to the mechanism in the event that ice forms thereon. However, the usual safety fork employed with firing mechanisms for depth charges of the type considered herein is employed and mounted with respect to the valve in such a manner as to form an ice connection therewith whenever ice forms on the mechanism sufficiently to seal the valve thereto. Accordingly, when the depth charge is launched, the detachment of the safety fork during the launching operation breaks the seal between the mechanism and the valve to permit the free movement thereof.

In addition to the aforesaid plurality of depth settings in which either electrical or mechanical firing of the detonator unit may occur, the present arrangement provides an "Electrical" setting or position of the mechanism in which only electrical firing of the detonator unit can occur and a "Safe" setting or position in which neither electrical nor electrical or mechanical firing can occur. The detonator unit may be fired electrically by any suitable electrical control mechanism adapted to close a firing circuit between the detonator unit and a source of electrical energy in response to signals of predetermined strength received from a suitable means for detecting a submarine within the vicinity of the descending depth charge.

An object of the present invention is to provide a new and improved firing mechanism for a depth charge of the type adapted to be fired selectively either electrically only or electrically or mechanically at a predetermined depth of submergence within the water.

Another object of the invention is to provide a new and improved depth charge firing mechanism in which the detonating means and booster charge therefor readily may be installed thereon or removed therefrom without disassembling the mechanism.

Another object of the invention is the provision of a hydrostatically controlled depth charge firing mechanism having new and improved means for arming and firing the mechanism under pressure of the surrounding water and for preventing such operation of the mechanism by shocks received thereby.

Another object of the present invention is the provision of a depth charge firing mechanism having new and improved means for facilitating an arming, firing and recocking operation of the mechanism for purposes of inspection and tests without disassembling the mechanism.

A further object of the invention is the provision of a hydrostatically controlled depth charge firing mechanism having a plurality of different depth settings and new and improved means for calibrating the operation of the mechanism with respect to the depths indicated by the settings.

A still further object of the invention is the provision of a new and improved hydrostatically controlled firing mechanism for a depth charge in which the valve therefor is arranged in such a manner as to render the mechanism operative notwithstanding the launching of the depth charge under freezing conditions.

Additional objects of the invention are to provide a depth charge firing mechanism of simple and rugged construction which is reliable in operation, affords a high degree of safety in the handling thereof and of the assembled depth charge, and provides a high degree of control of the firing of the depth charge at a predetermined depth of submergence within the water.

Still other objects, advantages, and improvements are those expressly set forth in or implied from the following description, reference being had to the accompanying drawings wherein.

Figure 1:
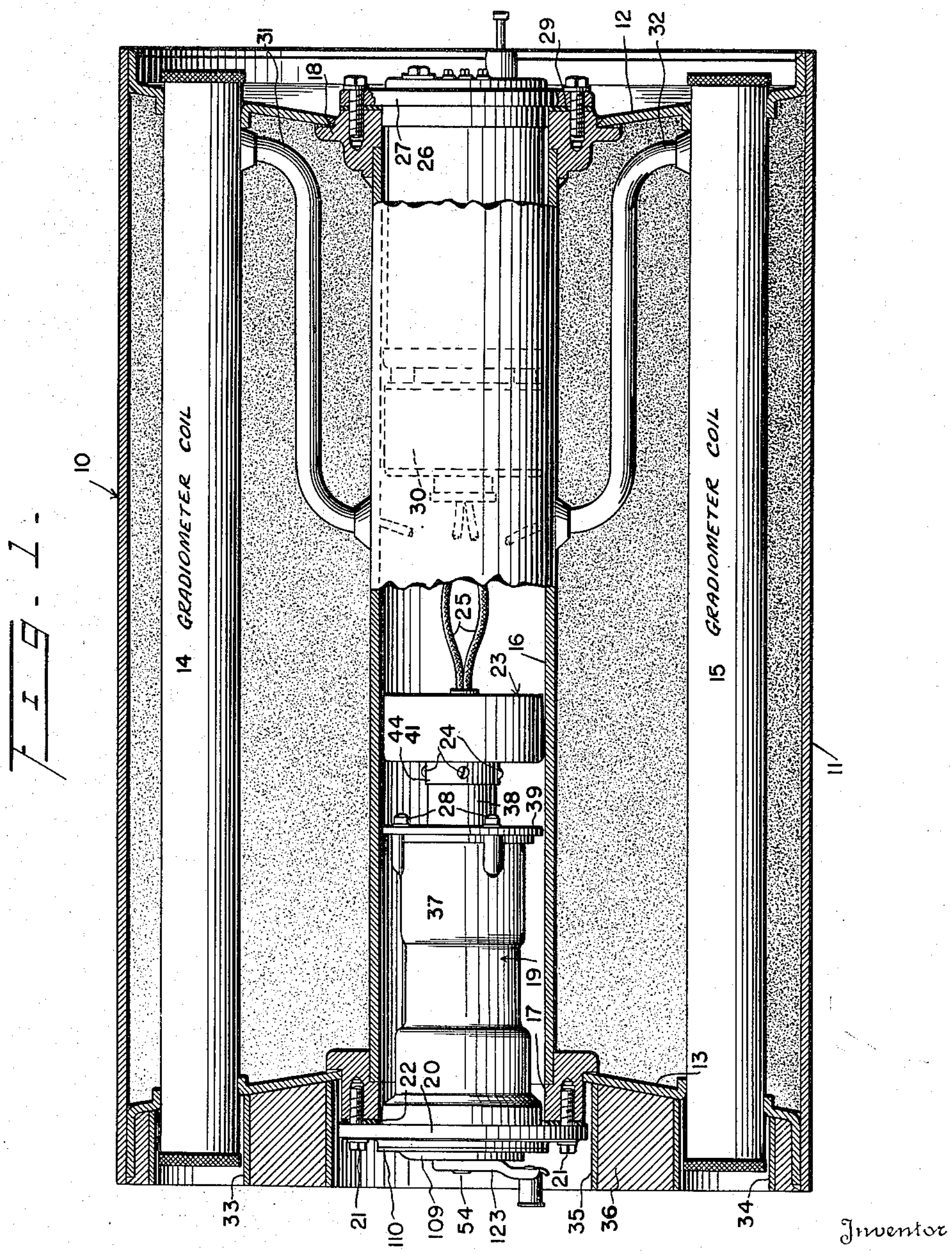
Fig. 1 is a sectional view, showing a complete depth charge suitable for use with and employing the firing mechanism of the present invention.

Referring now to the drawings and more particularly to Fig. 1 thereof the numeral 10 generally designates a depth charge comprising a cylindrical wall 11 having end walls 12 and 13 respectively secured to the ends thereof as by welding or otherwise rigidly secured and sealed thereto. Capped tubular members 14 and 15 are supported by the end walls within suitable apertures formed therein and may be sealed to the end walls in any suitable manner as by welding the parts together. Arranged within the tubular members 14 and 15 are a pair of gradiometer coils and control devices therefor adapted to balance the coils with respect to each other sufficiently to prevent the generation of an electrical signal thereby as the coils are moved in any direction within a uniform magnetic field.

Arranged within the cylindrical wall 11 and preferably centrally with respect thereto is a tubular member 16 having flanged members 17 and 18 respectively secured to the ends thereof in any siutable manner. The end walls 12 and 13 are provided with centrally arranged apertures to receive the flange members 17 and 18 respectively whereby these members may be secured and sealed to the end walls thereby to support and secure the tubular member 16 with respect thereto. Disposed within the tubular member 16 is a firing mechanism or pistol generally designated by the numeral 19 and having a flanged support 20 by means of which the mechanism rigidly may be secured to the flange 17 preferably by a plurality of bolts 21, a gasket 22 being interposed between the flanges 17 and 20 to provide a watertight connection therebetween. The mechanism has a booster charge generally designated by the numeral 23 secured thereto as by a plurality of screws 24, the leads 25 from a detonator unit within the mechanism extending outwardly therefrom through the booster charge as will appear in greater detail as the description proceeds.

The leads 25 extend to an electrical firing control mechanism 26 also disposed within the member 16 and having a supporting flange 27 by means of which the mechanism is secured to the flange 18 generally in the same manner that the mechanism 19 is secured to the flange 17. The mechanism 26 is adapted to close a circuit from a battery 30 through the leads 25 to the detonator unit when the mechanism 26 receives a signal from the gradiometer coils indicative of a submarine within the vicinity of the descending depth charge, a pair of tubular ducts 31 and 32 extending from the tubular members 14 and 15 respectively to the member 16 and having arranged therein a plurality of conductors for establishing the necessary electrical connections between the gradiometer coils and the control devices therefor and the electrical firing mechanism 26.

The firing control mechanism 26 may be of any type suitable for the purpose such, for example, as the firing mechanism disclosed in the copending application of Waldron S. Macdonald et al., Serial No. 453,550, for Firing Control Mechanism for a Depth Charge, filed August 4, 1942.

The unoccupied space within the casing provided by the walls 11, 12 and 13 is filled with T.N.T. which may be cast therein in the usual manner substantially as shown in Fig. 1. One end of the depth charge is preferably weighted to cause the same to assume an upright position within the water with the axis of the casing in a substantially vertical position as the depth charge sinks within the water. For this purpose, circular partitions 33, 34 and 35 are secured to the end wall 13 and disposed respectively about the members 14, 15 and 17, and arranged within the space provided by the partitions is a mass of heavy nonmagnetic material 36 which may be of any type suitable for the purpose such, for example, as lead.

The firing mechanism 19 comprises a housing 37 which is generally of tubular configuration and is preferably formed as a casting having the flanged support 20 integrally formed therewith. The opposite end of the housing 37 is closed by a cylindrical cup-shaped guide member 38 having a flanged portion 39 which is adapted to be received into registered engagement with the housing at 40 and secured in such position preferably by a plurality of screws 28.

The member 38 supports the booster charge 23 which is substantially in the form of a toroid comprising a cup-shaped casing 41, the open end of which is closed by an end wall 42 suitably secured and sealed thereto in any convenient manner. Disposed centrally of the casing is a tubular member 43 which is supported by the casing and end wall within suitable apertures arranged therein and sealed and secured thereto in any suitable manner, the intervening space being filled with a suitable booster charge such, for example, as tetryl. The supporting flange 44, secured to the casing 41 as by soldering, readily renders the booster charge adaptable for installation on the member 38 or for removal therefrom.

The tubular member 43 is adapted to receive a detonator unit generally designated by the numeral 45 for slideable movement therein, the detonator unit comprising a tubular housing or holder 46 within which a detonator 47 is disposed adjacent to transverse apertures 48 in the holder adapted to permit radial firing of the detonator therethrough. Also disposed within the holder 46 in abutting relation to the detonator 47 is an electroresponsive primer 49 therefor, the leads 25 of which are arranged to pass through the holder and out through the booster charge. Disposed within the holder at the opposite end of the detonator 47 is a percussion primer 50 therefor which is seated upon a member 51 suitably formed to permit an operative firing relation between the primer and the detonator.

The detonator unit 45 is detachably supported by a sleeve 52 and the parts preferably are threaded for mutual engagement whereby the detonator unit readily may be secured to or removed from the sleeve, the detonator unit being received into the member 38 through an aperture 29 arranged therein substantially in alinement with the tubular member 43. Thus, by reason of the foregoing arrangement of the detonator unit and the booster charge, if desired, the detonator unit may be removed from the sleeve by any convenient means and withdrawn from the booster charge through the tubular member 43 without necessitating the removal of the booster charge.

The sleeve 52 is slideably supported within the enlarged tubular end poriton 53 of a piston 54 and is held against rotation with respect thereto by means of a woodruff key 55 which is carried by the sleeve and adapted to move along a key-way 56 provided in the piston, a U-shaped retaining ring 57 carried by the piston having a bight portion which extends into the key-way thereby to prevent the sleeve from dropping out of the piston during the assembly thereof.

Slideably supported for movement within the sleeve is a firing pin 58 having a hammer or firing point 59 adapted to engage the percussion primer 50 in a manner to fire the same. The firing pin is normally locked to the sleeve at a distance from the percussion primer by means of a pair of balls 60 which are received into diametrically opposed apertures 61 provided in the sleeve and are normally forced by the piston into an annular groove or recess 62 formed in the firing pin. However, when the piston is moved relatively to the sleeve into a position in which the balls are adjacent to a recess or groove 63 formed internally on the piston, the balls are adapted to be forced outwardly by the firing pin into the groove thereby to release the firing pin. The firing pin carries a cup-shaped washer 64 adapted to move slideably along the reduced end portion of the firing pin and is yieldably held in registered engagement with the shoulder provided by the reduction in diameter of the end portion of the pin by means of a cushioning spring 65 which is interposed between the washer 64 and a washer 66 secured to the end of the firing pin.

The firing pin is normally urged in the direction of the percussion primer by a firing spring 67 which is interposed between the piston and the washer 64. However, the firing pin is normally prevented from moving in such direction by a pair of balls 68 which are received into diametrically opposed apertures 69 provided in the piston, the balls being forced into an annular recess 73 provided in the bore 71 of the member 38 by the action of the washer 64 thereon under compression of the firing spring 67.

The piston 54 is slideably supported by the member 38, the tubular portion 53 of the piston being mounted for axial movement along the bore 71 of the member. When the piston moves in the direction of the booster charge, the balls 68 are forced out of the recess 70 against the pressure on the washer 64 and into an annular recess or groove 72 provided on the firing pin, thereby to lock the firing pin and sleeve to the piston for movement therewith until the balls 68 are moved adjacent to an annular recess 73 formed internally of the member 38. At this time further movement of the sleeve is arersted by reason of the engagement thereof with the bottom of the member 38, and the detonator unit occupies an operative firing position relative to the booster charge. Further movement of the piston is relative to the sleeve and the firing pin 58, the balls 68 being forced by the piston against the sleeve and thereafter into the groove 73 thus releasing the lock between the piston and the firing pin and sleeve. Movement of the piston relative to the firing pin compresses the firing spring 67 until the groove 63 on the piston moves adjacent to the balls 60 whereupon the firing pin is released and moves under power of the firing spring with sufficient force to fire the percussion primer.

The movement of the piston is hydrostatically controlled by a suitable hydrostat such, for example, as an expansible bellows 74 well known in the trade as a Sylphon bellows, the bellows being arranged to move freely along the internal bore 76 of the housing. The bellows is secured as by soldering to a suitable seat 75 therefor, which seat is in the form of a washer adapted to be secured as by brazing to the shoulder formed at the junction of the rod portion of the piston 54 and the tubular portion 53 thereof. The free end of the bellows is similarly secured as by soldering to a somewhat larger washer 77 which extends into abutting relation with respect to a shoulder 78 provided by an increase in the internal diameter of the housing, the washer being maintained in such position by means of a ring nut 79 threadedly received into the housing, and a gasket 80 being interposed between the washer and the shoulder thereby to provide a water-tight connection therebetween.

Figure 4:
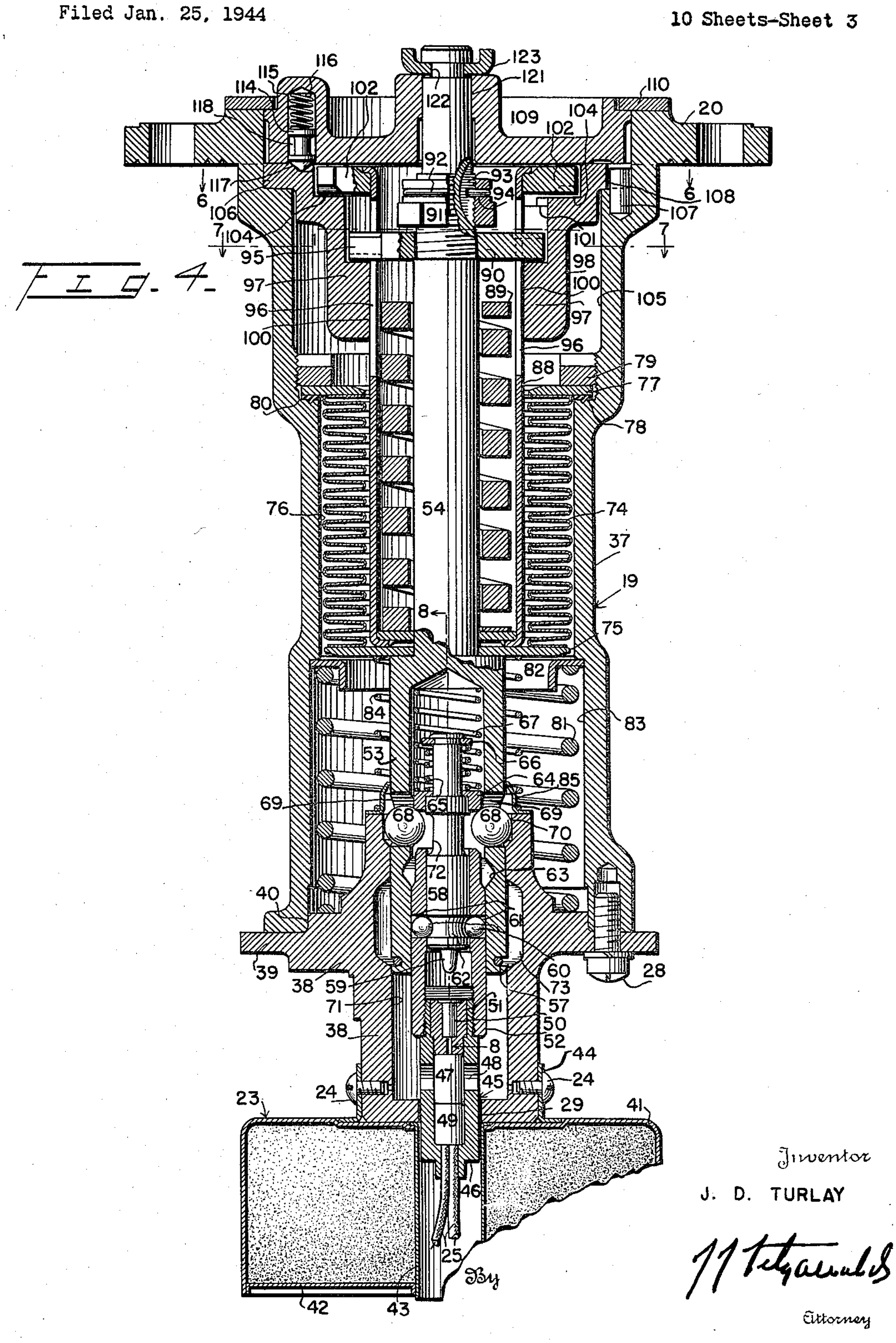
Fig. 4 is a view taken along the line 4—4 of Fig. 2 showing the mechanism in the safety position thereof before the arming fork has been removed.
Figure 8:
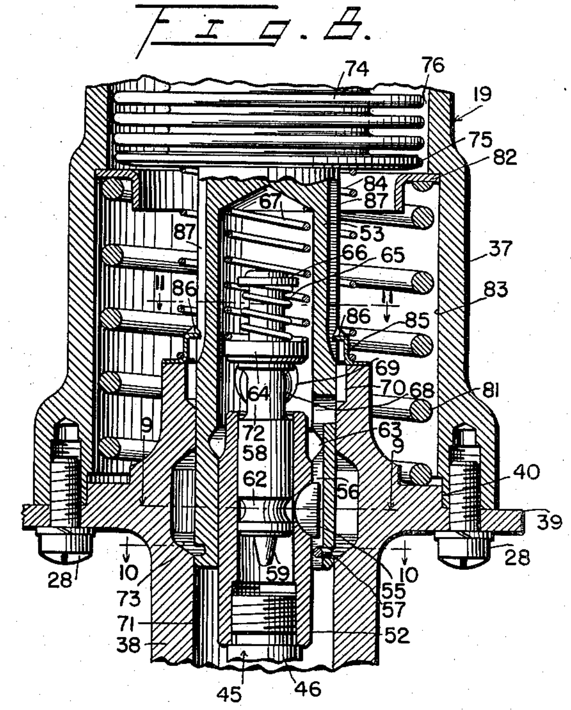
Fig. 8 is a fragmentary sectional view taken substantially along the line 8—8 of Fig. 4.
Figure 9:
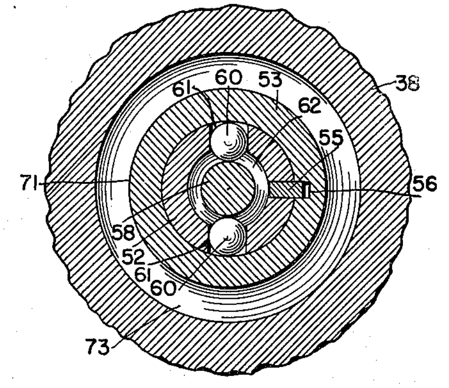
Fig. 9 is a cross sectional view taken along the line 9—9 of Fig. 8.
Figure 10:
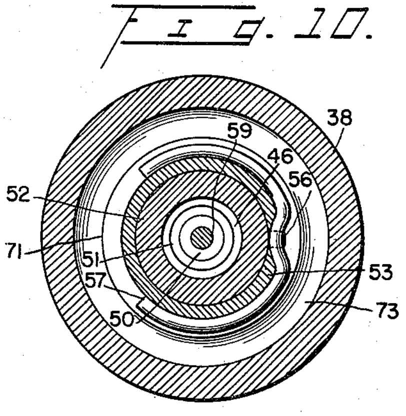
Fig. 10 is a cross sectional view taken along the line 10—10 of Fig. 8.
Figure 11:
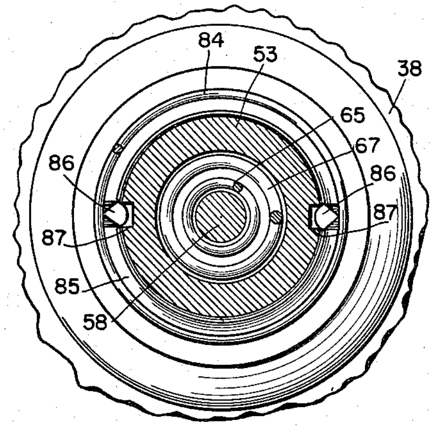
Fig. 11 is a cross sectional view taken along the line 11—11 of Fig. 8.
Figure 12:
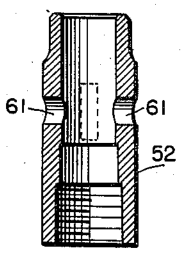
Fig. 12 is a detail sectional view of the sleeve.
Figure 13:
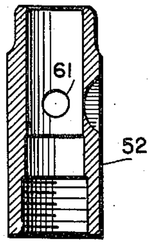
Fig. 13 is a detail sectional view of the sleeve taken at right angles to Fig. 12.

The bellows 74 is initially compressed somewhat into the position shown on Fig. 4 by an arming spring 81 which is interposed between the member 38 and the bellows, a spring seat 82 being interopsed between the spring and the bellows and adapted to move freely along the enlarged bore 83 of the housing into abutment with the shoulder provided thereby with the bore 76. A similar spring 84 is disposed about the tubular portion 53 of the piston between the bellows and a ball retaining ring 85 seated upon the member 38, the ring being adapted to retain the balls 68 within the piston during the assembly thereof. If desired, the ring 85 may be provided with diametrically opposed inwardly extended peened portions 86 which are adapted to be received by suitable slots 87 formed in the tubular portion 53 of the piston thereby to prevent movement of the ring beyond the apertures 69, the slots being terminated at the apertures as clearly appears in Fig. 8.

Disposed within the bellows and freely mounted on the piston 54 for slideable movement with respect thereto is an elongated cup-shaped depth setting member 88, and disposed within the member 88 which serves as a guide therefor and arranged about the piston is a depth setting spring 89 which is adapted to be engaged by a ring member 90 carried by the piston when the piston moves through a predetermined distance in the direction of the booster charge. The ring member 90 is freely carried on the reduced threaded portion of the piston and is retained thereon by a calibrating nut 91, the nut being held in any one of a plurality of adjustable positions on the piston by means of an annular retaining ring 92 having an inwardly projecting portion adapted to enter a key-way 93 formed in the piston by way of any one of a plurality of selectable apertures 94 provided in the nut.

Figure 5:
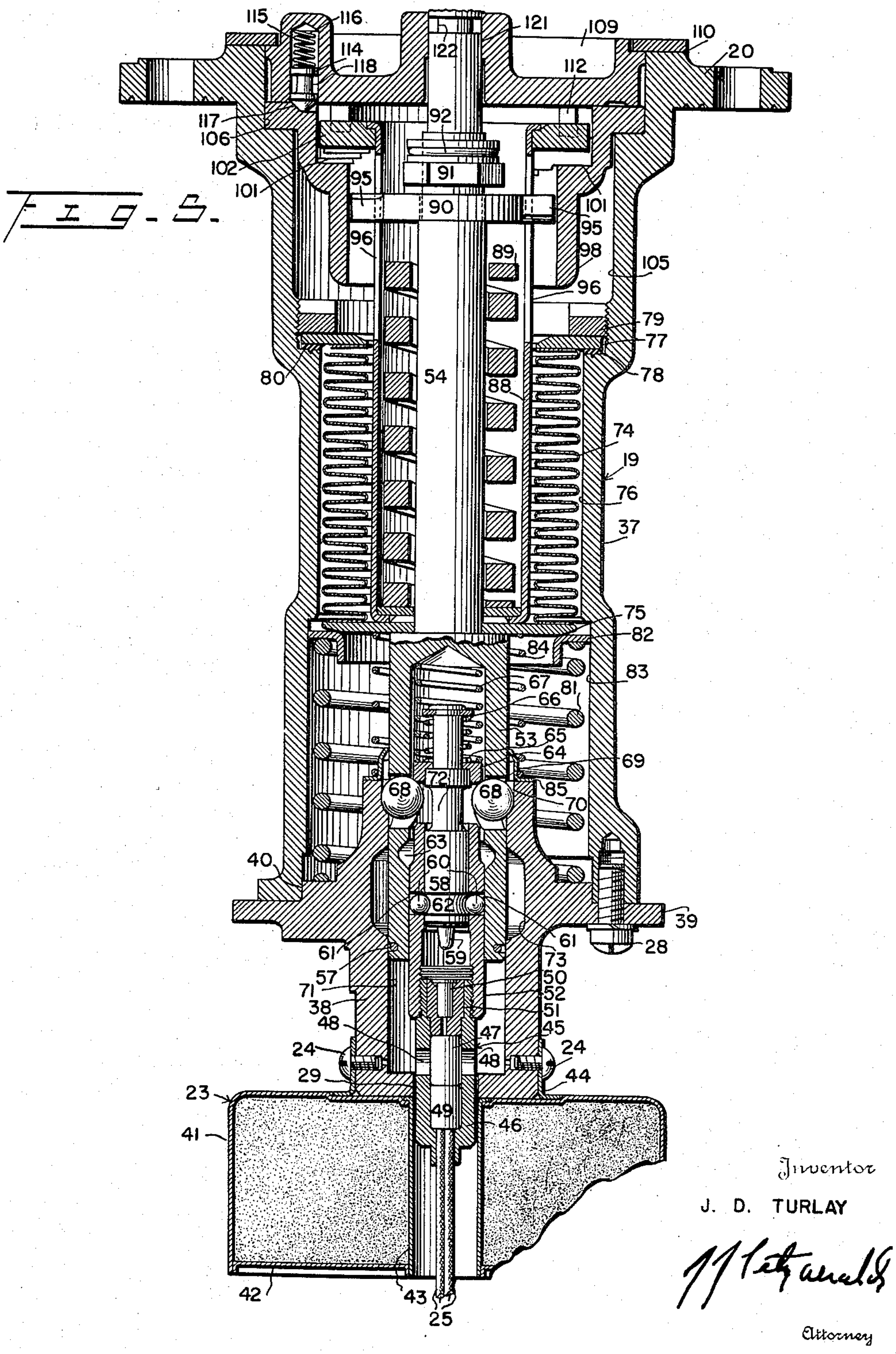
Fig. 5 is a view similar to Fig. 4 showing the arming fork removed and the mechanism in operation.
Figure 6:
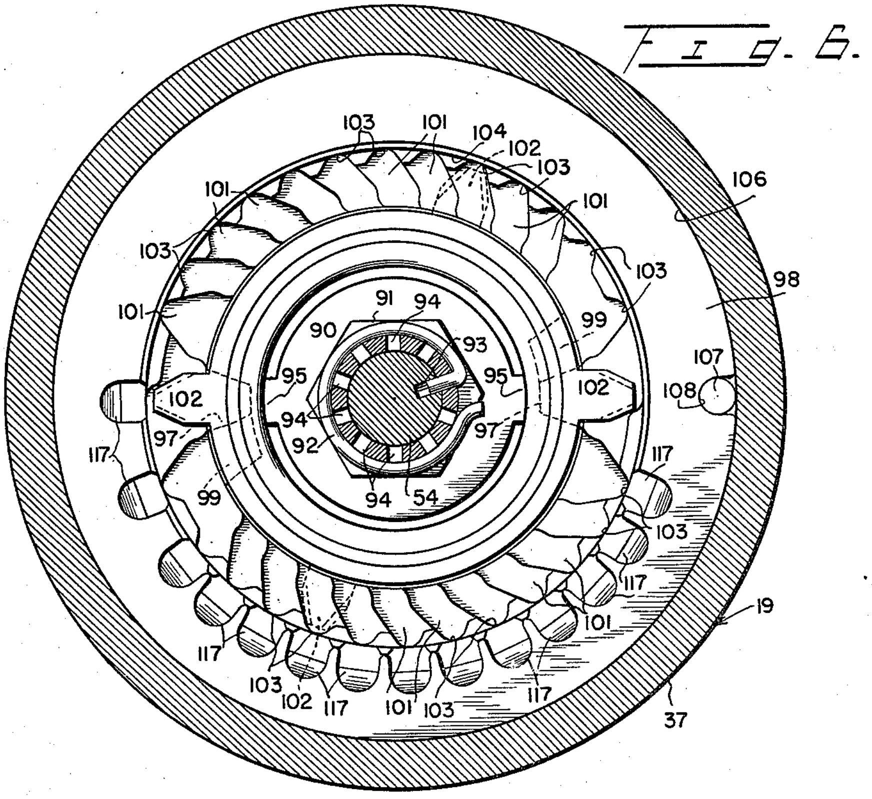
Fig. 6 is a sectional view taken along the line 6—6 of Fig. 4.
Figure 7:
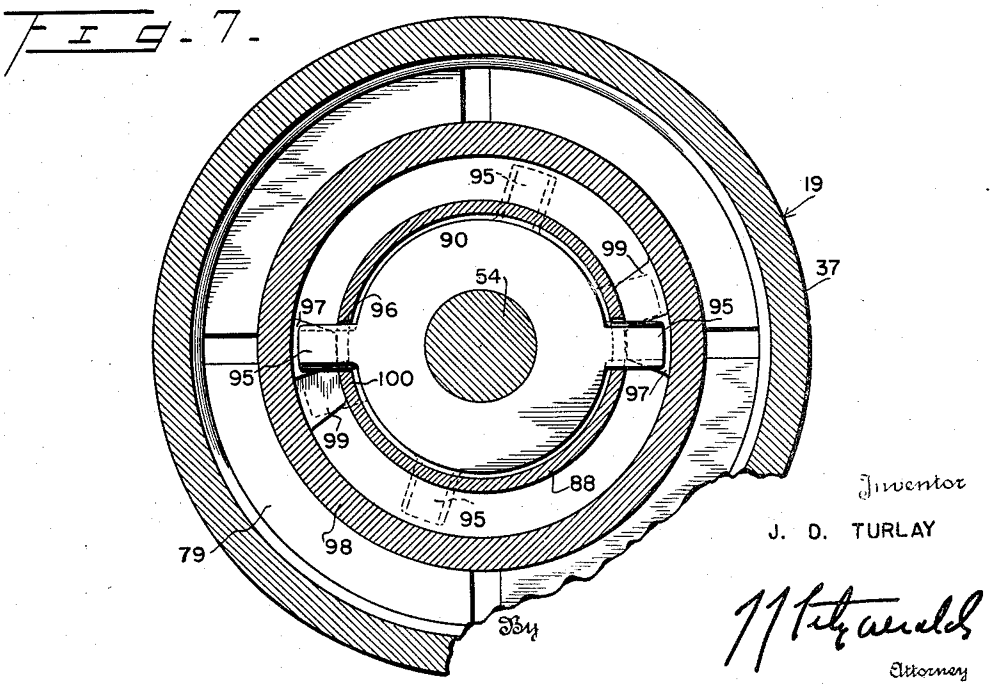
Fig. 7 is a sectional view taken along the line 7—7 of Fig. 4.
Figure 17:
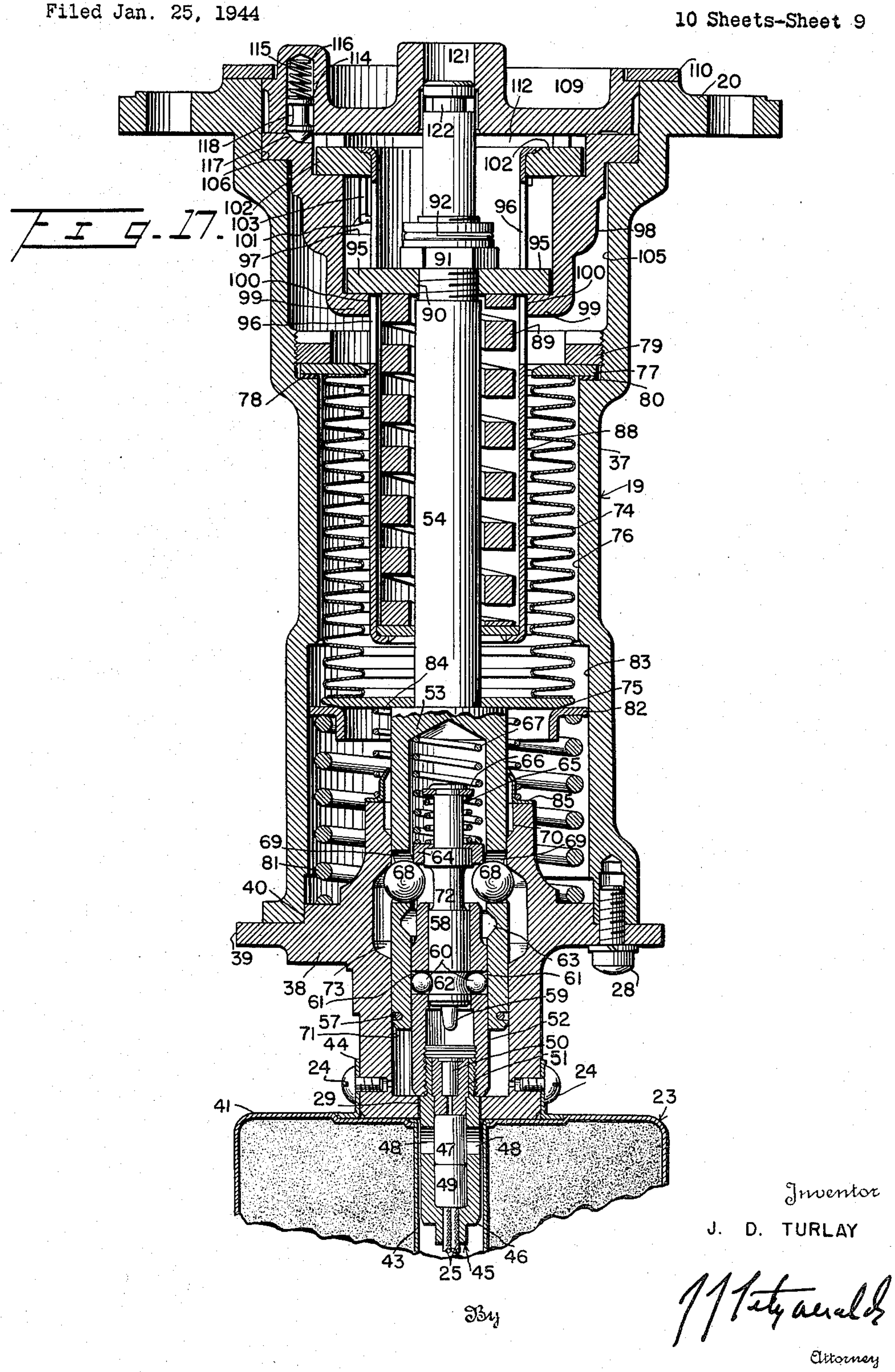
Fig. 17 is a sectional view taken substantially centrally of the mechanism and showing the mechanism in the armed position thereof when set for electrical firing.
Figure 20:
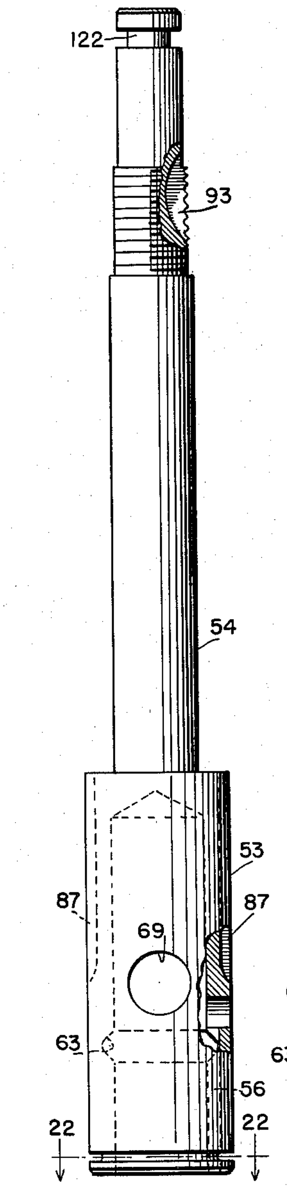
Fig. 20 is an elevational view partly in section of the piston.
Figure 21:
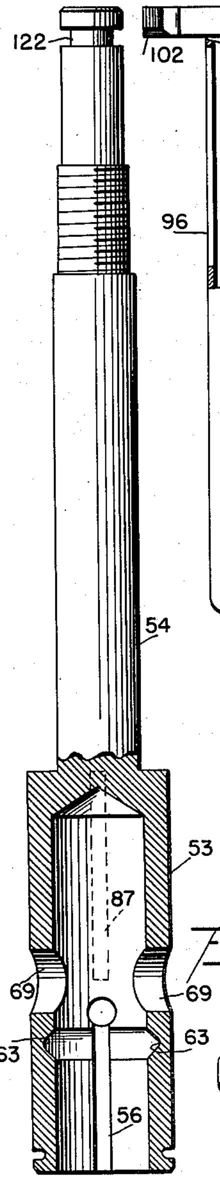
Fig. 21 is an elevational view partly in section of the piston taken at right angles to Fig. 20.
Figure 26:
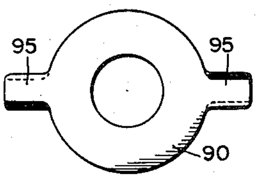
Figs. 26, 27, 28 are top, side, and end views of the pressure ring.
Figure 28:
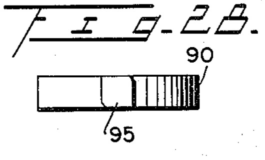
Figure 27:
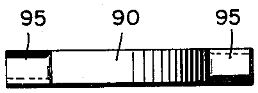
Figure 22:
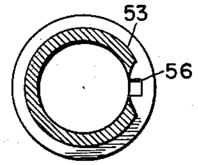
Fig. 22 is a sectional view taken along the line 22—22 of Fig. 20.

The ring member 90 is provided with diametrically opposed arms 95 which extend respectively through diametrically opposed slots 96 provided in the cup-shaped member 88 into abutting relation with respect to stops or lugs 97 arranged upon the inner wall of a cup-shaped member 98 when the member 88 is rotated into a position providing such abutting engagement. In such position, which appears very clearly in Figs. 4 and 7, movement of the piston is prevented except for the relatively small movement thereof in bringing the calibrating nut 91 into engagement with the ring 90, thus providing a "Safe" position in which the piston cannot be moved to arm or to fire the mechanism. The member 88 also may be rotated into an "Electrical" position, Fig. 17, in which the arms 95 are adapted to engage stops or lugs 99, also arranged on the inner wall of the member 98, upon movement of the piston sufficient to arm the mechanism. However, the further movement of the piston is arrested by reason of such engagement, and, accordingly the mechanism in such position is subject to being fired electrically only. When the member 90 is rotated into any position other than the "Safe" or "Electrical" position such, for example, as the position indicated by the dashed lines for the arms 95 shown in Fig. 7, there are no stops to obstruct the movement of the member 90, as appears in Fig. 5, and the piston is free to move into the firing position thereof thereby to fire the mechanism mechanically. The arms 95 preferably are provided with beveled edges, as clearly appears in Figs. 26 through 28, to facilitate the movement between the stops 97 and 99. These stops are preferably formed integrally with the member 98 and further serve as a slideable guide for the member 88 at 100.

Figures 2, 3:
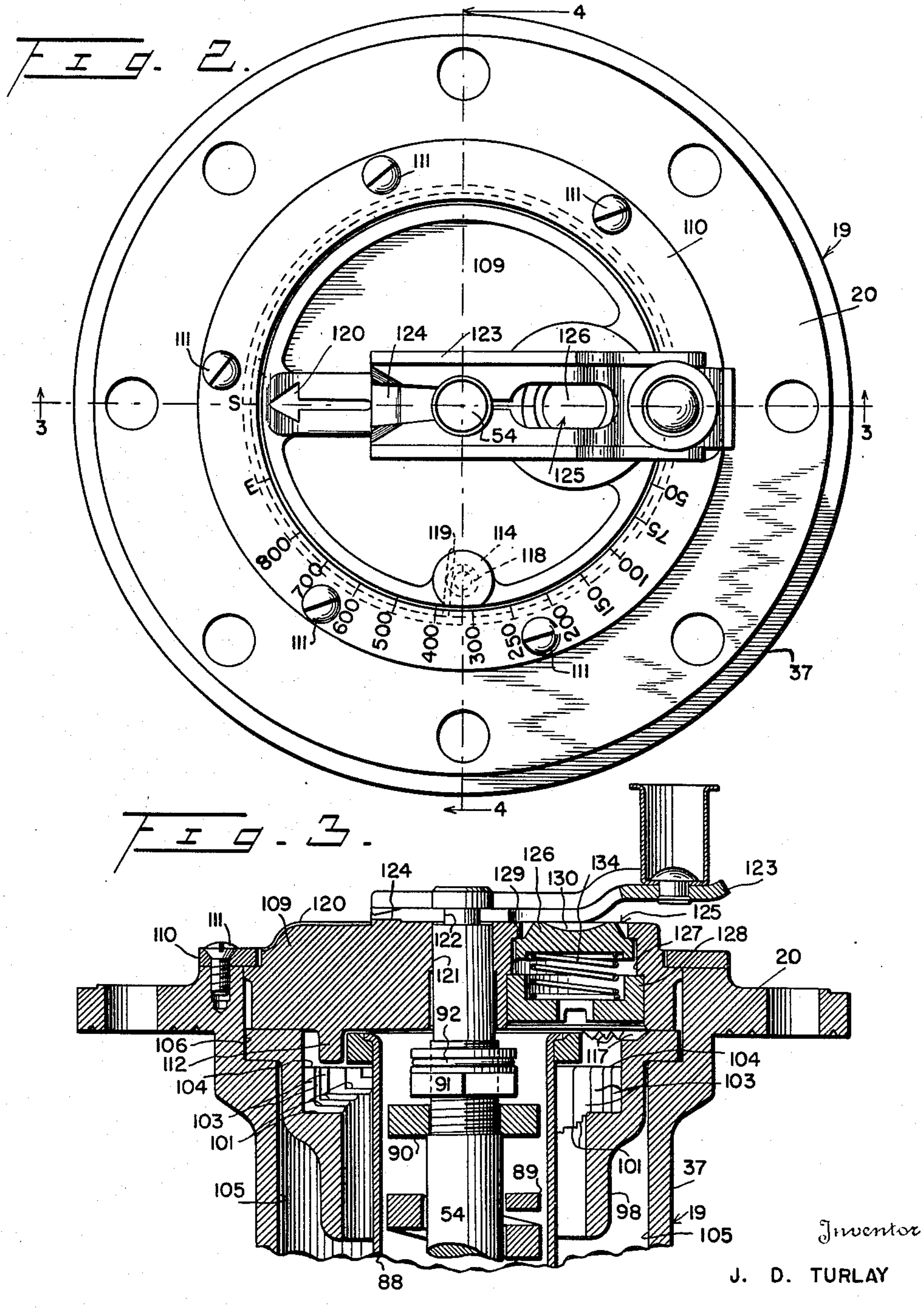
Fig. 2 is a somewhat enlarged plan view of the firing mechanism of Fig. 1.
Fig. 3 is a fragmentary sectional view taken along the line 3—3 of Fig. 2.
Figure 23:
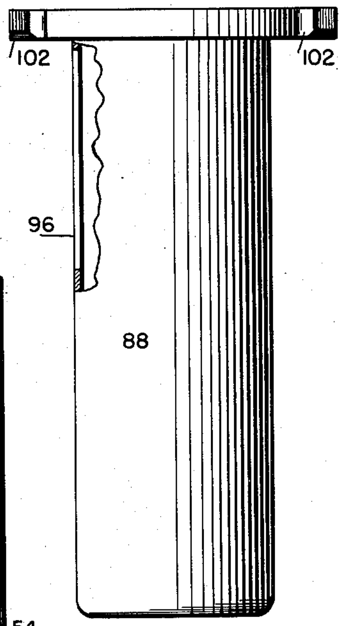
Fig. 23 is an elevational view partly in section of the depth setting member.
Figure 24:
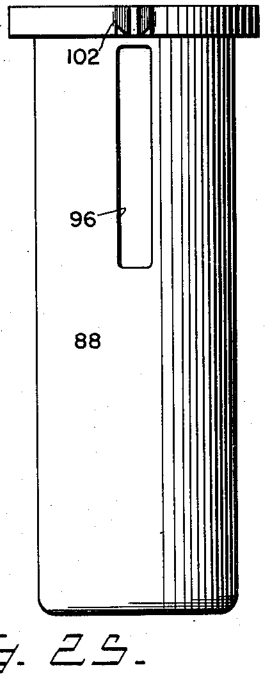
Fig. 24 is an elevation view of the depth setting member taken at right angles to Fig. 23.
Figure 25:
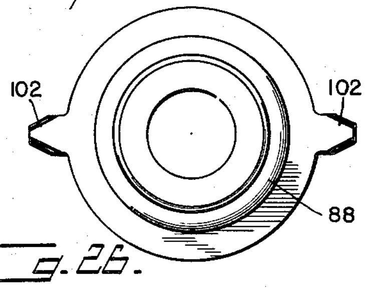
Fig. 25 is a bottom plan view of the depth setting member.

Also formed along the inner wall of the member 98, but at a greater internal diameter thereof, are a plurality of pairs of diametrically opposed steps 101 of varying depths which are adapted to be engaged selectively by the diametrically opposed arms 102 rigidly secured to the open end of the cup-shaped member 88 when the member 88 is rotated into any one of a plurality of selectable positions corresponding respectively to the plurality of pairs of steps and the member 88 is moved sufficiently by the piston by reason of the spring connection therebetween to cause such engagement. The steps also are preferably formed integrally with the member 98 and have longitudinal depressions 103 extending upwardly therefrom adapted to guide the arms 102 toward the preselected steps, the depressions 103 terminating at 104 thereby to permit rotative movement of the arms when the member 88 occupies the position shown in Figs. 3 and 4, in which position the arms are moved clear of the guide depressions. The arms 102 also are preferably formed with beveled edges, as clearly appears in Figs. 23 through 25, thereby to facilitate the movement of the arms between the pairs of steps 101.

The cup-shaped member 98 is received into the enlarged bores 105 and 106 of the housing 37 and is adapted to be seated upon the shoulder provided therebetween, relative rotation between the member 98 and the housing being prevented by the provision of a pin 107 secured to the housing and received into a notch 108 provided in the member 98.

Mounted for rotation within the bore 106 and seated upon member 98 is an adjustable setting dial 109 which is preferably retained in such position by a washer or ring 110 secured to the housing 37 as by a plurality of screws 111. Depending from the dial, which is preferably in the form of a casting, are a plurality of arcuate ribs 112 arranged in such a manner as to provide diametrically disposed slots 113 therebetween, which slots are adapted to receive the arms 102 of the member 88 when the member occupies the position shown on Fig. 5, for example, thus providing an arrangement for locking the member 88 to the dial for rotation therewith and, in addition, permitting slidable movement of the member 88 with respect to the dial. Moreover, the ribs 112 depend closely adjacent to the guide depressions 103 thereby to insure that the arms enter the depressions before leaving the slots 113 when the member 88 is moved by the piston.

The arms 102 of the member 88 are positioned in alignment with the several depressions 103 leading to the steps 101 by reason of a detent means provided on the dial 109, which detent means comprises a detent pin 114 slidably mounted in a counter bore 115 provided in the dial, a spring 116 interposed between the dial and the detent pin being provided to urge the detent into one of a plurality of depressions 117 provided on the face of the member 88 and aligned diametrically with the plurality of depressions 103 respectively. The detent pin is provided with an annular groove or recess 118 adapted to receive a pin 119 which is secured to the dial, thereby to retain the pin in the dial when the dial is removed from the mechanism. The retaining washer 110 is preferably provided with a plurality of indicia corresponding respectively to each of the settings of the dial such, for example, as the indicia comprising the numerals 50, 75, 100, 150, 200, 300, 400 and 500, and the letters E and S illustrated on Fig. 2 to which a pointer 120, formed by reason of a depression in the dial, is adapted to be brought selectively into alinement therewith, the letters E and S corresponding to the aforesaid "Electrical" and "Safe" positions of the piston respectively.

The dial has a centrally arranged bore 121 adapted to receive slidably the reduced end portion of the piston 54, the end of the piston extending beyond the dial when the piston is in the cocked position thereof as appears in Fig. 4. The projecting portion of the piston is provided with an annular groove 122 adapted to receive the bifurcated portion of the usual safety fork 123 thereby to prevent movement of the piston when the fork is placed in position on the piston. The fork is retained in the angular position shown on Fig. 2 by reason of the raised portion 124 on the dial, which raised portion is adapted to be engaged interfittingly by the bifurcated portion of the fork. In this position the fork projects over and above the inlet valve of the mechanism generally designated by the numeral 125.

The valve 125 comprises a button-shaped valve member 126 adapted to move within a cylindrical chamber provided by an aperture or port 127 in the dial 109, the inner end of the chamber being closed by a seat 128 for the valve member and the other end of the chamber being reduced somewhat at 129 to retain the valve member therein. The valve member is normally maintained in abutment against the shoulder provided at 129 by means of a spring 134 interposed between the valve member and the seat therefor, thereby normally to close the port 127. The diameter of the valve member is somewhat smaller than that of the chamber. Accordingly, when the valve member moves to compress the spring under pressure of the water thereon, the water is admitted to the mechanism along the sides of the valve member, the water pressure being insufficient to compress the spring to the extent that the valve member is seated upon the valve seat therefor. However, in the event that a sudden impulse of pressure is received through the surrounding water such, for example, as might be caused by an explosion of another depth charge within the vicinity of the descending depth charge, the valve member fully seats upon the valve seat therefor thereby to close the port and prevent a surge of water within the mechanism sufficient to arm or fire the same.

In the event that ice has formed on the depth charge just prior to the launching thereof and in such a manner as to seal the valve member within the valve chamber, an ice connection is also provided between the fork 123 and the valve member by reason of the ice forming between the bifurcation of the fork and a depression 130 formed on the face of the valve member. Thus, by this arrangement, the ice seal on the valve member is broken when the fork is detached from the firing mechanism by moving against a fixed object during the launching of the depth charge, thereby to render the valve operative notwithstanding freezing temperatures during the launching of the depth charge.

Figure 15:
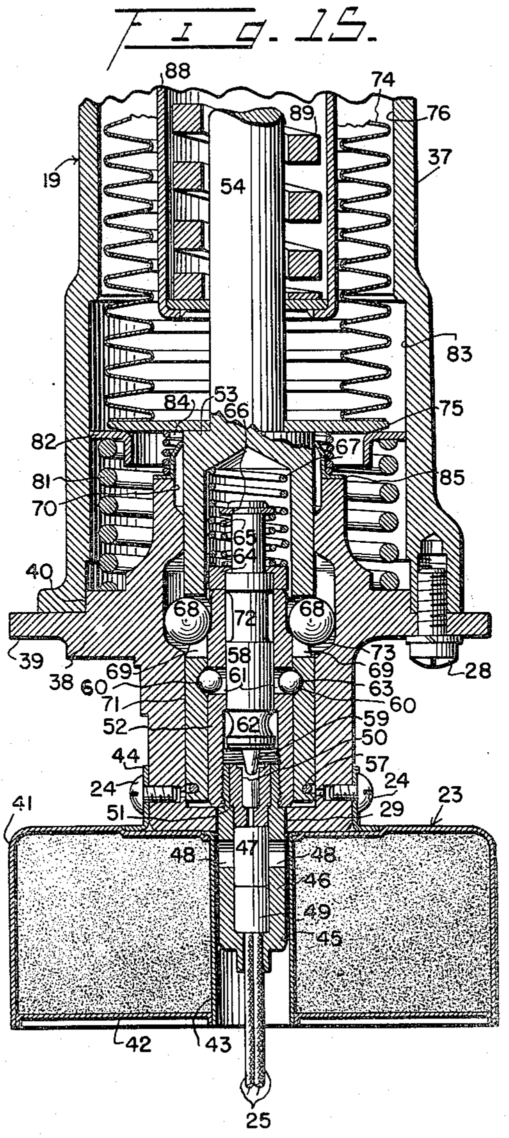
Fig. 15 is a fragmentary sectional view similar to Fig. 14 and showing the firing pin moved into the firing position.

The extent of pressure required within the bellows 74 to move the piston 54 from the initial or cocked position as shown in Fig. 4, the safety fork 123 being removed, into the firing position of Fig. 15 is controlled by the extent to which the depth setting spring 89 is compressed during the movement of the piston between such positions. The moment at which compression of the depth setting spring begins for any particular setting of the dial 109 is controlled by the distance through which the piston must move before the spring connection between the piston and the depth setting member 88 becomes effective to move the depth setting member and the additional distance through which the piston must move thereafter to move the depth setting member into engagement with the pair of steps corresponding to the particular setting of the dial. Thus, the variation in the depths of the several steps provides a means for adjusting the lost motion in the connection between the piston and depth setting member thereby to vary the distance through which the piston moves after the connection becomes effective to compress the spring and, consequently, to vary the compression of the depth setting spring and cause a firing of the depth charge at different depths of submergence within the water by selectably adjusting the dial with respect to the steps.

The present invention, by provision of the calibrating nut 91, provides a means for adjusting the pressure required to fire the mechanism with respect to a pressure or depth indicated by a particular setting of the dial. Adjustment of the calibrating nut 91 varies the distance through which the piston must move before the spring connection between the piston and the depth setting member 88 becomes effective to compress the depth setting spring by reason of the resulting variation in the distance through which the piston must move before the ring member 90 is clamped between the calibrating nut and the depth setting spring. Thus, the foregoing adjustment provides a means for calibrating the mechanism. In practice, for example, the mechanism is mounted upon a pressure pot which is adapted to move the piston by supplying air under pressure within the bellows. The dial is set in any suitable position such, for example, as "100" and the air pressure required to move the piston into the firing position thereof is determined. In the event that the determined pressure is not within permissible limits of the pressure or depth indicated by the selected setting of the dial, the calibrating nut is adjusted until an acceptable operation of the mechanism is obtained, the calibrating nut being readily accessible upon removal of the washer 110 and dial 109. The calibrating adjustment compensates for variations within manufacturing tolerances of the spring rates of the several springs of the mechanism and for variations from dimensional and other physical requirements thereof. Accordingly, the calibration of the operation of the mechanism against one depth setting thereof serves to calibrate the operation of the mechanism against all of the depth settings and thereby renders the mechanism susceptible of a high degree of control of the firing of the mechanism at each predetermined depth of submergence thereof within the water.

Figure 14:
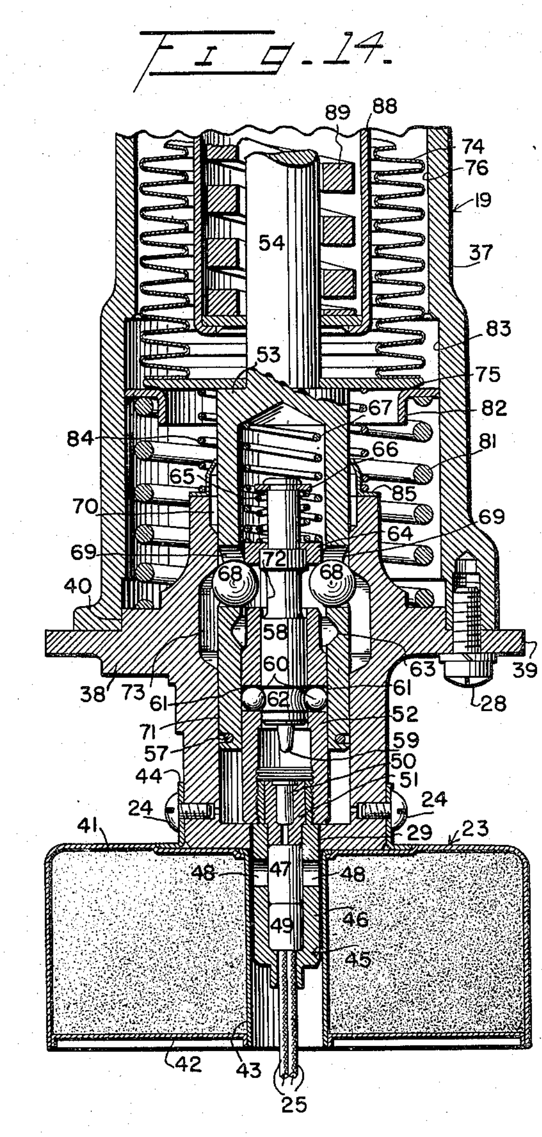
Fig. 14 is a fragmentary sectional view of the mechanism showing the detonator moved to the extended or armed position.

The operation of the device will now be described. Let it be assumed, by way of example, that the depth regulating dial is set with the pointer 120 thereof opposite the numeral 300 whereby the depth charge is adapted to be fired by hydrostatic pressure at a depth of submergence of 300 feet in the event that the depth charge is not fired by signals received from the gradiometer coils within the tubular members 14 and 15 before this depth submergence is attained. As the depth charge is launched, the safety fork 123 is detached by a fixed member arranged within the path of travel of the safety fork. As the depth charge sinks within the water, the valve member 126 moves inwardly to open the port 127 to admit water through the member 98 and into the bellows 74 thereby causing the bellows to expand against the opposing force of the arming spring 81 and to move the piston 54 in the direction of the booster charge 23. Movement of the piston forces the balls 68 inwardly of the recess 70 in the member 38 and against the pressure of the washer 64 thereon to a position sufficiently within the groove 72 formed on the firing pin 58 to permit continued movement of the piston along the bore 71, the piston, firing pin and sleeve 52 thereafter being moved as a unit until the sleeve bottoms on the member 38 at which time the detonator unit 45 reaches the armed position thereof with respect to the booster charge 23 as shown in Fig. 14. When this position is reached, the depth charge is sunk within the water to a predetermined depth such, for example, as 35 feet, and the detonator unit is now adapted to be fired by the electrical firing control mechanism 26 in response to a change in the magnetic field detected by the gradiometer coils in the event that the depth charge travels sufficiently near a submerged submarine to receive a signal corresponding to a predetermined gradient of the magnetic field set up by the submarine.

If it be assumed, for the purpose of description, that the depth charge does not pass sufficiently near the submarine to fire the depth charge electromagnetically, the balls 68 are forced by the piston into the recess 73 within the member 38 when the balls move adjacent thereto as the piston moves relative to the sleeve. Continued movement of the piston compresses the firing spring until the piston reaches the firing position thereof as shown in Fig. 15 at which time the depth charge reaches the predetermined depth of 300 feet. In this position of the piston, the groove 63 therein is adjacent to the balls 60, and the balls are forced into the groove by the pressure of the firing pin thereon thereby releasing the firing pin under power of the firing spring 67 to strike the percussion primer 50 with sufficient force to fire the same.

Figure 16:
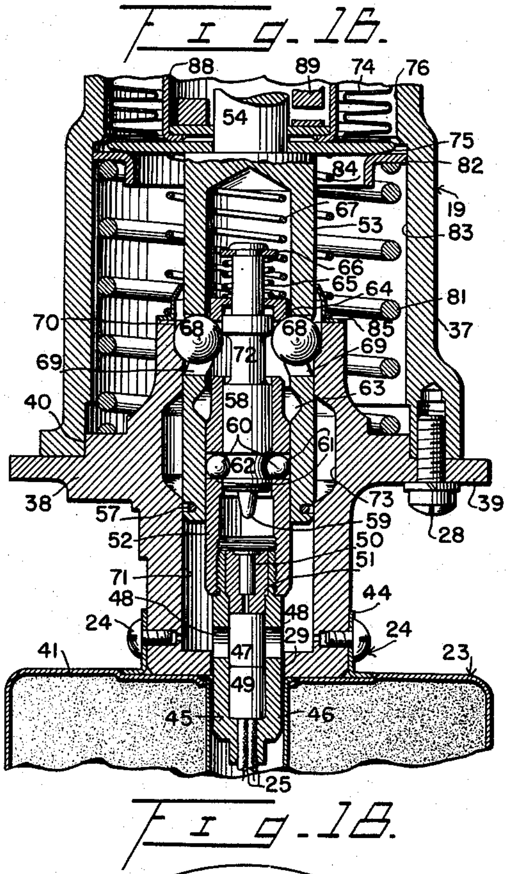
Fig. 16 is a fragmentary sectional view showing the positions of the piston and firing pin respectively caused by sudden shock.

In the event that the mechanism or the assembled depth charge is dropped through a distance such, for example, as 10 feet, inertia forces developed by the piston and firing pin in a direction to move these parts toward an armed and firing position thereof are unable to fully move these parts in such direction by reason of the interlocking connection between the member 38, piston, and firing pin provided by the balls 68. In such case, the inertia force on the firing pin moves the same between the balls 68 as the inertia force on the piston moves the piston into contact with the balls, the balls normally being retained in the recess 70 by the pressure of the washer 64 thereon. Accordingly, movement of the firing pin is limited by the complete compression of the cushioning spring 65, and the firing pin, being moved between the balls, locks the same against radial movement within the bore 71 and thereby prevents further movement of the piston, the parts assuming the positions substantially as shown in Fig. 16, for example, in response to a light shock received by the mechanism.

By reason of the releasably interlocking connections between the piston, firing pin, and sleeve the mechanism may be fired and recocked for purposes of testing and inspecting the same, the detonator unit and the booster charge being removed. For the above purposes the piston may be moved into the firing position thereof, Fig. 15, either by means of the aforesaid pressure pot or by moving the piston manually into such position. When the pressure on the piston is released, the piston, firing pin and sleeve move in the direction of their initial positions under power of the arming spring 81 until the balls 68 are locked in the groove 73 by the pressure of the sleeve on the balls, the sleeve being locked to the piston by the balls 60. The piston, sleeve and firing pin may be released from this locking position and the parts restored to their initial positions under power of the arming spring by applying a force in any suitable manner to the end of the firing pin sufficient to move the same into a position in which the recess 62 is adjacent to the balls 60. In this position, the pressure of the piston on the balls 60 forces the same out of the recess 63 in the piston thereby to permit the sleeve and firing pin to move in the direction of the booster charge and thereby permit the balls 68 to move out of the recess 73 whereupon the piston moves into the initial or cocked position thereof, as shown in Fig. 4.

It will be noted that when the mechanism is in the "SAFE" position thereof as shown in Fig. 4, that the apertures 48 of the detonator holder 46 communicate with the open chamber provided by the bore 71. Accordingly, in the event that the detonator 47 is inadvertently fired when the detonator unit is in such position, the explosion is dissipated within the chamber thereby to prevent damage to the firing mechanism and/or injury to personnel in the handling thereof.

Figure 29:
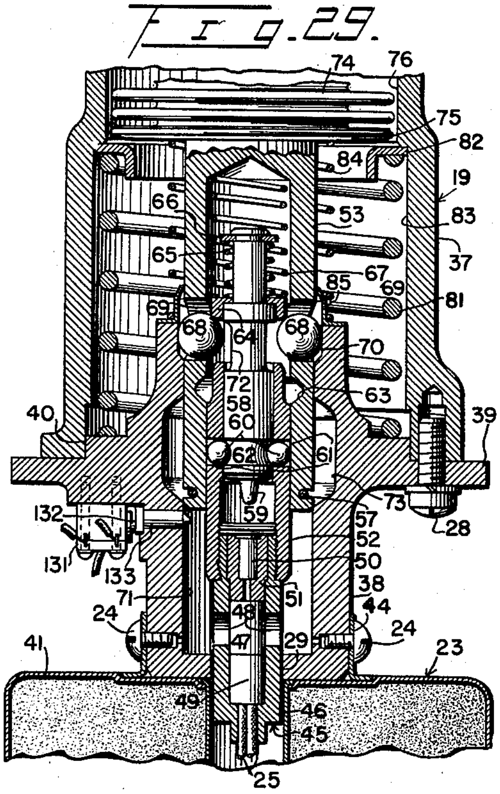
Fig. 29 is a fragmentary sectional view of an alternate form of the firing mechanism in which a switch device is employed therewith.
Figure 18:
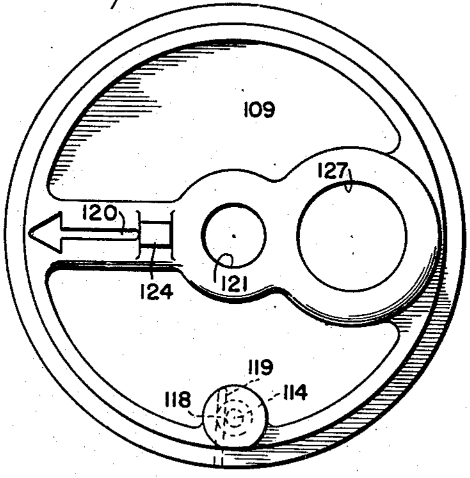
Fig. 18 is a top plan view of the dial.
Figure 19:
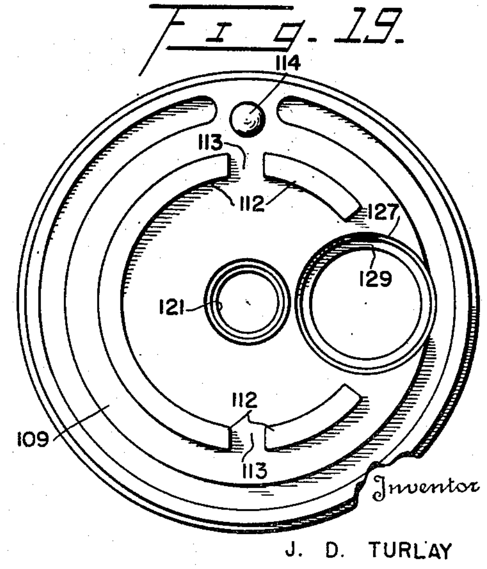
Fig. 19 is a bottom plan view of the dial.

Referring now to Fig. 29, there is shown thereon a modification of the present invention in which a switch device 131 is mounted on the member 38. The switch 131 has an actuable button 132 which is adapted to be moved by a plunger 133 which is mounted for slideable movement with respect to the member 38 and projects into the path of the piston 54. Thus, as the piston moves in the direction of the booster charge it is adapted to actuate the switch 131, which switch may be employed, for example, to complete a battery circuit to the electrical firing control mechanism 26 thereby to arm the same as the detonator unit is moved into an armed position with respect to the booster charge.

From the foregoing it should now be apparent that a depth charge firing mechanism of simple and rugged construction has been provided which is well adapted to fulfill the aforesaid objects of the invention. Moreover, it should be obvious that the novel arrangement of the several parts of the mechanism, which renders the same susceptible of a ready assembly or disassembly thereof, facilitates the calibration of the mechanism and the replacement, if need be, of vital parts of the mechanism such, for example, as the bellows. Furthermore, the several parts of the mechanism are arranged in such a manner as to insure that the mechanism will operate in accordance with preselected settings thereof, when the mechanism is so set, or to insure that the mechanism will not operate in other selectable positions thereof, when the mechanism is so set, as the case may be.

While the invention has been described in particularity with respect to but one embodiment thereof and one modification of the preferred embodiment, it will be obvious to those skilled in the art to which the invention appertains, after obtaining an understanding of the invention, that the invention is susceptible of additional embodiments, modifications and variations thereof without departing from the spirit of the invention as defined by the appended claims.

The invention herein described and claimed may be manufactured and used by or for the Government of the United States of America for governmental purposes without payment of any royalties thereon or therefor.

What is claimed as new and desired to be secured by Letters Patent of the United States is:

1. In a depth charge adapted to be launched within a body of water, in combination, a casing having an explosive charge arranged therein, detonator means, pressure responsive means for gradually moving said detonating means into an operative position with respect to said explosive charge as the depth charge descends through the water, plunger operated switch means, means actuated by said pressure responsive means effective to fire said detonator unit electrically after the detonator unit has reached said operative position and magnetic detecting means comprising initially electrically balanced coils effective upon electrical unbalanced to fire said detonator when the depth charge passes within the vicinity of a submarine as the depth charge continues to descend through the water, and means controlled by said pressure responsive means for firing said detonator unit mechanically when the depth charge reaches a predetermined depth of submergence.

2. In a depth charge adapted to be launched within a body of water, in combination, a casing having an explosive charge arranged therein, a detonator unit, pressure responsive means for gradually moving said detonating unit into an operative position with respect to said explosive charge as the depth charge descends through the water, plunger operated switch means actuated by said pressure responsive means effective to fire said detonator unit electrically after the detonator unit has reached said operative position and magnetic detecting means comprising initially electrically balanced coils effective upon electrical unbalance to fire said detonator when the depth charge passes within the vicinity of a submarine as the depth charge continues to descend through the water, means controlled by said pressure responsive means for firing said detonator unit mechanically when the depth charge reaches a predetermined depth of submergence, and means for preselecting the manner of firing said detonator unit at a preselected one of a plurality of predetermined depths of submergence.

3. In a firing mechanism of the class disclosed, in combination, a guide member, a piston slideably supported by said guide member, a firing pin slideably supported by said piston, ball means for locking the firing pin to the piston for movement therewith when a force adapted to move the piston is applied thereto, and a spring biased cup shaped washer surrounding said firing pin and engaging said ball means for locking said firing pin and said piston to said guide member when an inertia force is suddenly developed by the piston.

4. In a firing mechanism of the class disclosed, in combination, detonating means, a booster charge adapted to receive the detonating means into operative relation therewith, a guide member, a piston slideably supported by the guide member, a sleeve slideably supported by the piston and adapted to carry said detonating means, a first ball means for locking the sleeve to the piston for movement therewith to move the detonating means into said operative position with respect to the booster charge when a force adapted to move the piston is applied thereto, second ball means, a spring biased cup shaped washer surrounding said firing pin, said second ball means engaging said cup shaped washer, said first and second ball means cooperating to lock the sleeve and the piston to the guide when an inertia force is suddenly developed by the piston.

5. A firing mechanism of the class disclosed comprising, in combination, detonating means, a pressure responsive member adapted to be moved from a cocked position to a firing position when a predetermined pressure is applied thereto, means controlled by said member and effective to fire the detonating means when the member moves into said firing position, resilient means, and means providing a lost motion connection between the resilient means and the member in such a manner as to oppose yieldably the remaining movement of the member when said connection becomes effective thereby to control the pressure required to move the member into said firing position, said lost motion connection including a depth setting member and stop means therefor and a calibrating means, said stop means comprising a plurality of stops disposed at different distances from said depth setting member, said depth setting member being settable into a plurality of positions corresponding respectively to said plurality of stops and movable by the pressure responsive member into engagement therewith thereby to vary the lost motion in said connection between the depth setting member and the stop means therefor, and said calibrating means being carried by said pressure responsive member and movable thereon thereby to vary the lost motion in said connection between the resilient means and the pressure responsive member.

6. A firing mechanism of the class disclosed comprising, in combination, a piston adapted to be moved from a cocked position to a firing position when a predetermined pressure is applied thereto, a sleeve movably supported by the piston, a detonator unit carried by the sleeve, a firing pin movably supported by the sleeve and adapted to engage and fire the detonater unit, a booster charge adapted to receive the detonator unit into operative relation therewith, means for releasably locking the firing pin to the sleeve at a distance from the detonator unit, means for releasably locking the detonator unit at a safe distance from the booster charge, a firing spring yieldably interposed between the firing pin and the piston, means for yieldably retaining the piston in the cocked position thereof, means for releasably locking the firing pin and sleeve to the piston for movement therewith as the piston moves under pressure applied thereto until the detonator unit is moved into said operative relation with respect to said booster charge, means for arresting movement of the firing pin and sleeve when said operative relation is established, means for releasing the lock between the piston and the sleeve and firing pin when said relation is established. and means for releasing the lock between the sleeve and firing pin when the piston reaches said firing position thereby to cause the firing pin to engage and fire the detonator unit.

7. A firing mechanism of the class disclosed comprising, in combination, a piston adapted to be moved from a cocked position to a firing position when a predetermined pressure is applied thereto, a guide for movably supporting the piston, a sleeve movably supported by the piston, a detonator unit carried by the sleeve, a firing pin movably suported by the sleeve and adapted to engage and fire the detonator unit, a booster charge adapted to receive the detonator unit into operative relation therewith, a firing spring interposed between the piston and firing pin for yieldably urging the firing pin in the direction of the detonator unit, means for yieldably retaining the piston in the cocked position thereof, means associated with the piston, guide, and firing pin for releasably locking the detonator unit at a distance from the booster charge and for moving said piston, sleeve, and firing pin as a unit as the piston moves under pressure applied thereto until the detonator unit is moved into said operative relation with respect to said booster charge, means for arresting movement of the sleeve when said operative relation is established, and means associated with the piston, sleeve, and firing pin for releasably locking the firing pin to the sleeve at a distance from the detonator unit until the piston moves into said firing position thereby releasing the firing pin for movement thereof into firing engagement with the detonator unit.

8. In a firing mechanism of the class disclosed, a guide member, a first member mounted for movement within the guide member and adapted to be moved between a cocked position and a firing position when a predetermined force is applied thereto, a second member supported by the first member for movement with respect therto, a third member supported by the second member for movement with respect thereto, means including at least one ball associated with said first, second, and third members for releasably locking the third member to the second member until the first member moves into said firing position and thereafter releasably locking said second member to the first member, means including at least one ball associated with said first and third members and said guide member for releasably locking the third member to the first member for movement therewith until the first member reaches a position intermediate said cocked and firing positions, means effective to move said third member suddenly and forcibly into said firing position when said first member moves into the firing position, and means effective to restore said first, second, and third members to said cocked position when said third member is moved into the initial position thereof with respect to said second member.

9. In a firing mechanism of the class disclosed, a guide member, a first member mounted for movement within the guide member and adapted to be moved from a cocked position to a firing position when a predetermined force is applied thereto, a second member supported by the first member for movement with respect thereto, a third member supported by the second member for movement with respect thereto, means including at least one ball associated with said first, second, and third members for releasably locking the third member to the second member until the first member moves into said firing position, means including at least one ball associated with said first and third members and said guide member for releasably locking the third member to the first member for movement therewith until the first member reaches a position intermediate said cocked and firing positions, and means effective to move said third member suddenly and forcibly into said firing position when said first member moves into the firing position.

10. In a firing mechanism of the class disclosed, in combination, a casing, a first member mounted for movement within the casing and adapted to be moved from a cocked position to a firing position when a predetermined force is applied thereto, a second member movably supported by the first member and adapted to be moved thereby from said cocked position to a position intermediate said cocked and firing positions, a third member movably supported by the second member and adapted to be moved by the first member into said intermediate position, means associated with said first, second and third members for releasably locking the third member to the second member until the first member moves into said firing position, means associated with said first and third members for releasably locking the third member to the first member until said first member reaches said position intermediate said cocked and firing position, and means for suddenly and forcibly moving said third member from said intermediate position to said firing position when said first member moves to the firing position.

11. In a firing mechanism of the class disclosed, a guide member, a first member mounted for movement within the guide member and adapted to be moved from a cocked position to a firing position, a second member supported by the first member for movement with respect thereto, a third member supported by the second member for movement with respect thereto, means including at least one ball associated with said first, second, and third members for releasably locking the third member to the second member until the first member moves into said firing position, means including at least one ball associated with said first and third members and said guide member for locking the first and third members to the guide member when inertia forces are suddenly developed by said first and third members respectively and for releasably locking the third member to the first member for movement therewith when a predetermined force is applied to the first member, and means effective to move said third member suddenly and forcibly into said firing position when said first member moves into the firing position.

12. In a firing mechanism of the class disclosed, the combination of a guide member including stop means, a piston slidably supported within the guide member and adapted to be moved from a cocked position to a firing position when a predetermined pressure is applied thereto, a member telescopically mounted with respect to the piston, said stop means causing the piston to begin to move with respect to said member when the piston has moved to a position intermediate said cocked and firing positions, detonating means carried by the member, a firing pin movably supported by the member and adapted to engage and fire the detonating means, a firing spring interposed between the piston and firing pin and adapted to be compressed when the piston moves between said intermediate and firing positions, and means associated with the piston, member, and firing pin for releasably locking the firing pin to the member at a distance from the detonating means until the piston moves into said firing position thereby releasing the firing pin for movement into firing engagement with the detonator unit.

13. In a firing mechanism for a depth charge, in combination, a casing, a hydrostatically controlled piston mounted for movement within the casing and having a recessed portion at one end thereof, a port in the casing for admitting water therein, a valve member mounted for movement within the port and adapted to control the flow of water therethrough, said valve member being mounted within said port in such a manner as to be subject to being sealed to the casing by the formation of ice therebetween, and a bifurcated lever arm pivoted at said recessed portion of said piston for releasably locking the piston to the casing and adapted to be removed therefrom during the launching operation of the depth charge, said lever arm and said valve member being formed with a depression and disposed in face relation to the lever arm to cause an ice connection to be formed therebetween when an ice connection forms between the valve member and casing, said ice connection between the valve member and the lever arm serving to transmit a force sufficient to break the seal between the valve member and the casing when the lever arm is removed.

14. In a depth charge firing mechanism of the class disclosed, in combination, a hydrostatically controlled member adapted to be moved from a cocked position to a firing position when a predetermined pressure is applied thereto, a depth setting member mounted for slideable and rotatable movement with respect to said hydrostatically controlled member and adapted to be moved thereby into any one of a plurality of different stop positions intermediate said cocked and firing positions, a depth setting spring interposed between said depth setting member and said hydrostatically controlled member and adapted to be compressed therebetween after said depth setting member is moved into any one of said intermediate stop positions thereby to control the pressure required to move said hydrostatically controlled member from said cocked position to said firing position, a rotatably supported member settable into a plurality of different angular positions corresponding respectively to said plurality of intermediate stop positions, and means providing a rotatable and a slideable connection between said depth setting member and said rotatable member whereby the depth setting member may be rotatably adjusted with respect to said plurality of intermediate stop positions and notwithstanding the rotatable connection be free for slideable movement with said hydrostatically controlled member.

15. In a depth charge firing mechanism of the class disclosed, in combination, a hydrostatically controlled member adapted to be moved from a cocked position to a firing position when a predetermined pressure is applied thereto, a depth setting member mounted for slideable and rotatable movement with respect to said hydrostatically controlled member and adapted to be moved thereby into any one of a plurality of different stop positions intermediate said cocked and firing positions, a depth setting spring interposed between said depth setting member and said hydrostatically controlled member and adapted to be compressed therebetween after said depth setting member is moved into any one of said intermediate positions thereby to control the pressure required to move said hydrostatically controlled member from said cocked position to said firing position, a rotatably supported member settable into a plurality of different angular positions corresponding respectively to said plurality of intermediate stop positions, means providing a rotatable and a slideable connection between said depth setting member and said rotatable member whereby the depth setting member may be rotatably adjusted with respect to said plurality of intermediate stop positions and notwithstanding the rotatable connection be free for slideable movement with said hydrostatically controlled member, and means for retaining said depth setting member in an adjusted position with respect to a selected intermediate stop position when the slideable connection between the depth setting member and the rotatable member is discontinued during the movement of the depth setting member.

16. In a firing system for a depth charge of the character disclosed, the combination of a housing, a booster charge carried by the housing and having an opening extending therethrough, valve means carried by the housing for admitting the surrounding water thereinto, a piston mounted for movement within the housing variably in accordance with the pressure of the surrounding water, a safety device in releasable locking engagement with the piston and housing and retractable therefrom during the launching of the depth charge for preventing movement of the piston prior to launching, said device and said valve means being so constructed and arranged as to form an ice connection therebetween of sufficient strength to break an ice seal between the valve means and housing as the device is retracted, a detonator unit comprising detonating means and adapted to be attachably secured to the piston upon insertion through said opening in the booster charge and thereafter moved into said opening in the booster charge upon a first predetermined movement of the piston in response to the pressure of the surrounding water, means adapted to be rendered effective to fire the detonator unit mechanically upon an additional predetermined movement of the piston, means operatively connected to the piston and settable at will for predetermining the depth of submergence at which said mechanical firing occurs, means for preventing said first predetermined movement of the piston in response to an inertia shock received by the depth charge, and means adapted to be rendered effective to fire said detonator unit electrically after said first predetermined movement of the piston and when the depth charge has moved into proximity to a target vessel prior to reaching said predetermined mechanical firing depth.

17. In a firing system for a depth charge of the character disclosed, the combination of a housing including a guide member, a booster charge having an opening therethrough and detachably secured to said guide member, a pressure responsive piston mounted for slideable movement within said guide member variably in accordance with the pressure of the surrounding water, valve means for admitting the surrounding water to the piston in response to a gradual increase in the pressure of the water and adapted to prevent further entry of water to the piston in response to a sudden surge of pressure received through the water, a safety device releasably locked to the piston and to the housing and retractable therefrom during launching of the depth charge for preventing movement of the piston prior to launching, said device and said valve means being so constructed and arranged as to form an ice connection therebetween of sufficient strength to break an ice seal between the valve means and housing as the device is retracted, a detonator unit comprising detonating means and adapted to be detachably secured to said piston upon insertion through said opening in the booster charge and thereafter released from the piston after movement of the detonator unit into the opening in the booster charge and into operative firing relation with respect thereto upon a first predetermined movement of the piston in response to the pressure of the surrounding water, means effective to fire said detonator unit electrically after the detonator unit has reached said operative firing relation and when the depth charge passes within the magnetic influence of a target vessel, means controlled by said piston for firing said detonator unit mechanically when the depth charge reaches a predetermined depth of submergence, means settable into any one of a plurality of different positions for rendering said mechanical firing means effective to fire said detonating unit at any one of a plurality of different predetermined depths of submergence including said predetermined depth and corresponding respectively to said plurality of positions, and means for perventing said first predetermined movement of the piston in response to an inertia force received by the depth charge and adapted to releasably secure the detonator unit to the piston during said first predetermined movement thereof.

18. In a firing system for a depth charge, the combination of a casing, a pressure responsive element disposed within the casing, valve means on the casing adapted to be opened to admit the surrounding water to said element as the depth charge descends through the water and adapted to be closed in response to a sudden surge of pressure received through the water, a detonator unit, a movable member operatively secured to said element for movement therewith and detachably secured to said detonator unit for moving the detonator unit into operative firing relation with respect to the booster charge as the element is moved in response to a predetermined increase in the pressure of the surrounding water, ball locking means for detachably securing the detonator unit to said member during movement thereof into said operative firing relation and adapted to prevent said movement in response to an inertia shock received by the depth charge, a safety device retractable upon launching the depth charge and so constructed and arranged with respect to the valve means, member, and casing as to prevent movement of the member prior to launching and to insure operation of the valve means following launching, means controlled by the member and effective to fire the detonator unit mechanically upon an additional predetermined movement of the member, means operatively connected to the member and settable at will into any one of a plurality of different positions corresponding respectively to a plurality of different depths of submergence for predetermining the depth of submergence at which said mechanical firing occurs, and means adapted to be rendered effective to fire the detonator unit electrically by magnetic influence when the depth charge moves into proximity to a target vessel after the detonator has been moved into said operative firing relation.

19. In a firing device comprising, in combination, a substantially cylindrical casing, a hydrostatically controlled piston mounted for slideable movement concentrically within the casing and having a tubular portion at one end thereof, a sleeve movably supported internally of said tubular portion of the piston, a detonator unit carried by the sleeve, a booster charge removably mounted at one end of said casing concentrically therewith and having a longitudinal central passage thereby permitting the removal of the detonator unit from said sleeve and said casing without necessitating the removal of the booster charge from said casing, said detonator unit being adapted to be moved into the central passage of said booster charge by the hydrostatically controlled piston.

20. In a firing device comprising in combination, a substantially cylindrical casing, a hydrostatically controlled piston mounted for slideable movement concentrically within the casing and having a tubular portion at one end thereof, a sleeve movably supported internally of said tubular portion of the piston, a detonator unit carried by the sleeve, a booster charge removably mounted externally at one end of said casing concentrically therewith and having a longitudinal central passage to permit said detonator unit to be moved into said central passage by the hydrostatically controlled piston, whereby said detonator unit and said booster charge may be removed from said casing without necessitating the disassembly of said detonator unit and said booster charge.

References Cited in the file of this patent

UNITED STATES PATENTS

| | | |
|---|---|---|
| 1,295,097 | Anderson | Feb. 25, 1919 |
| 1,314,664 | Huber | Sept. 2, 1919 |
| 1,326,156 | Elia | Dec. 23, 1919 |
| 1,368,569 | Minkler | Feb. 15, 1921 |
| 1,382,374 | Maxim | June 21, 1921 |
| 1,617,674 | Deiter | Feb. 15, 1927 |
| 1,639,665 | Pratt | Aug. 23, 1927 |
| 1,780,592 | Johansson | Nov. 4, 1930 |
| 1,814,152 | Harrison | July 14, 1931 |
| 1,977,835 | Rose | Oct. 23, 1934 |
| 2,096,671 | Demotte | Oct. 19, 1937 |
| 2,221,856 | Bartholomew | Nov. 19, 1940 |
| 2,353,406 | Kouyoujian | July 11, 1944 |
| 2,431,319 | Ellwood | Nov. 25, 1947 |

FOREIGN PATENTS

| | | |
|---|---|---|
| 110,915 | Great Britain | Nov. 6, 1917 |